May 26, 1931.    T. F. HAMILTON    1,806,680

ADJUSTABLE ENGINE FOR AIRCRAFT

Filed Jan. 5, 1929

INVENTOR
THOMAS F. HAMILTON
BY Dodson & Roe
ATTORNEYS

Patented May 26, 1931

1,806,680

UNITED STATES PATENT OFFICE

THOMAS F. HAMILTON, OF MILWAUKEE, WISCONSIN, ASSIGNOR TO THE HAMILTON STANDARD PROPELLER CORPORATION, OF WEST HOMESTEAD, PENNSYLVANIA, A CORPORATION OF PENNSYLVANIA

ADJUSTABLE ENGINE FOR AIRCRAFT

Application filed January 5, 1929. Serial No. 330,573.

My invention relates to air craft which are equipped with a plurality of motors, which are provided so that if one of them develops trouble the remaining motor or motors will have sufficient power to drive the plane and enable it to land instead of crashing. Assuming the plane to be equipped with two or more motors, should either of the ones mounted on the wings fail, it becomes very difficult to hold the plane on the desired course, owing to the great sidewise pull of the other motor mounted on the wing.

My invention has for its object, to provide a construction whereby, in event of such a mishap taking place, the pilot or mechanician may, without leaving the cockpit, move the functioning engine towards the center of the plane so that the objectionable condition is to a great extent overcome.

This may be done without interrupting the continuous operation of the motor and the propeller driven thereby.

Figure 1:
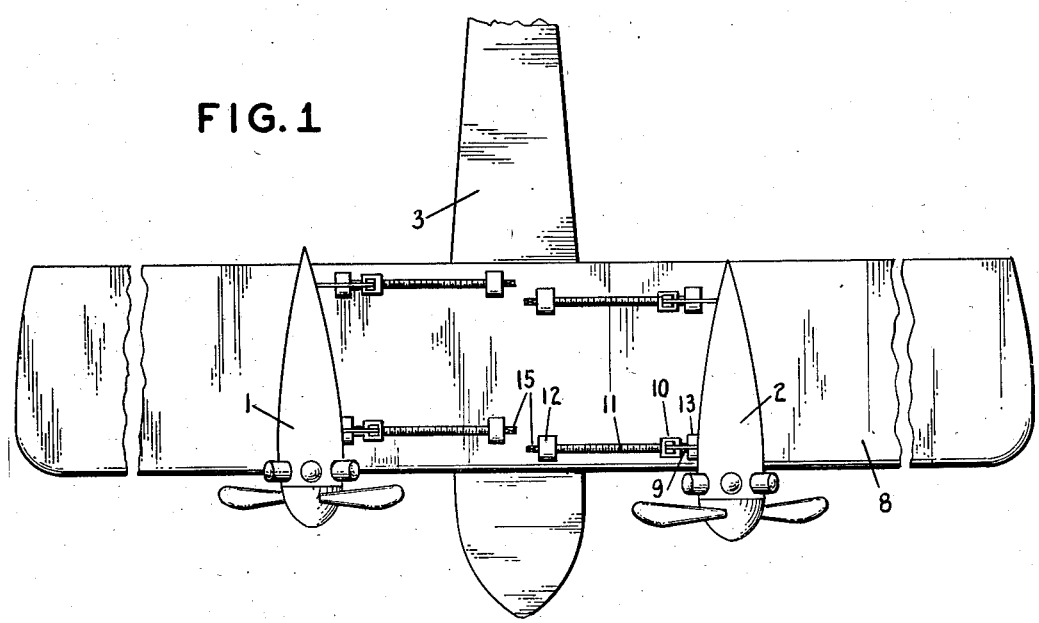
Figure 2:
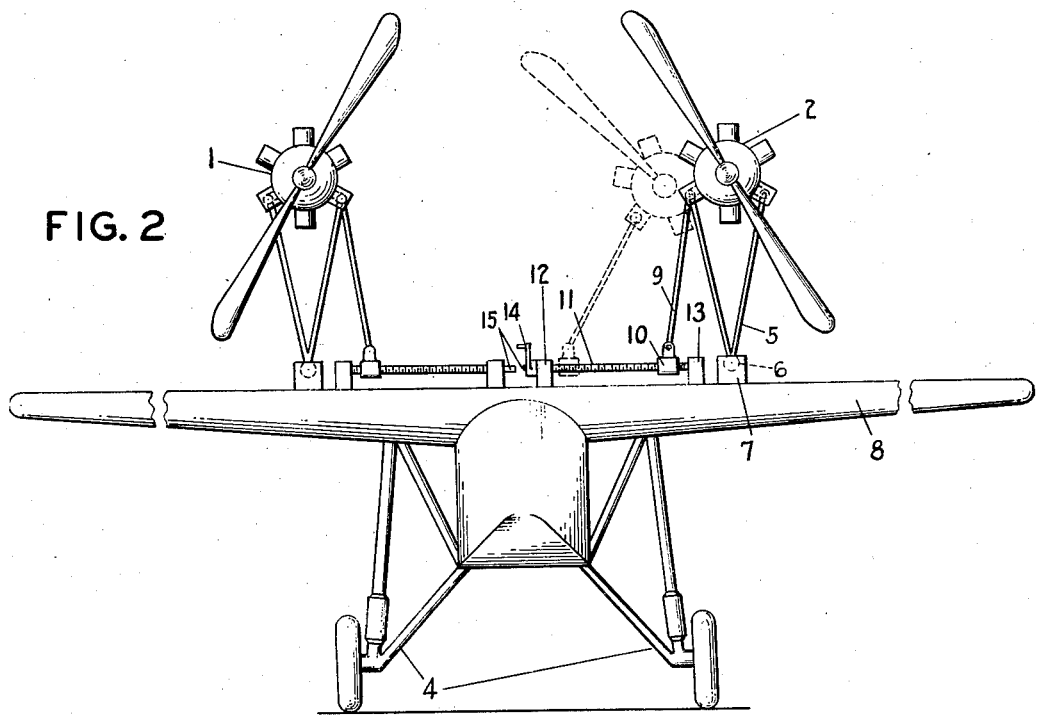

My means of accomplishing the foregoing object may be more readily understood by having reference to the accompanying drawings, which are hereto annexed and are a part of this specification. Though I show in the drawings a specific type of construction embodying my invention, I desire it to be understood that these drawings are merely for illustrative purposes, and are not to be deemed as limitations, nor even as disclosing the preferred construction to be utilized in carrying my invention into practical use, but as simply a concrete illustration of one way in which my invention may be employed. With this explanation, Fig. 1 is a top or plan view of a plane, equipped with a pair of motors which are provided with my improvement;

Fig. 2 is a front view of the same.

Similar reference numerals refer to similar parts throughout the entire description.

As shown in the drawings, the engines 1 and 2 are shown mounted above the wings and at each side of the fuselage 3, which is provided with the usual landing gear 4. Each of the engines is carried by a V-shaped support 5, which is pivoted at 6 to a base 7 mounted on the wing structure 8. The top of one arm of the V-shaped support 5 is pivotally connected to one end of a link 9, the other end of which is pivotally connected to a block 10 which is mounted upon a screw-threaded rod 11.

This rod 11 is held against longitudinal movement in bearings 12 and 13 in which the rod 11 rotates. A similar type of support may be provided at the rear of the engine, but as it is a duplication of the front I shall not describe it further.

A crank 14 is provided and fitted to the squared end 15 of the rod 11, and should one of the motors get out of commission, the pilot, by placing the crank 14 on the end of the rod 11 which is supporting the motor which is running, and rotating the crank 14, will, since the rod 11 cannot move longitudinally, cause the threaded block 10 to travel along the rod 11 and thus, as seen by the dotted lines in Fig. 2, draw the engine which is usable towards the center of the plane, in which position it will be very much more effective and the pilot can more easily maintain his course.

By the means shown the operating motor may be moved under the control of its pivoted support and the movable link 9 to the position shown in dotted lines in Fig. 2. During all of this movement the operation of the motor and the propeller driven thereby is uninterrupted and the motor is supported by a constantly-rigid, but movable frame work. That is to say the motor is never released from a rigid supporting structure, permitting its continuous operation.

For the purpose of full disclosure of my invention, I have described in some detail a specific embodiment thereof; but it will be apparent that numerous changes might be made in the physical embodiment of the invention within the scope of the claims, and I do not desire, therefore, to be understood as limiting myself, in the broader aspects of my invention, to the specific construction shown and described.

Having thus described my invention, what I regard as new, and desire to secure by Letters Patent of the United States, is:

1. The combination, with an airplane, of a plurality of engines, pivotal supports for said engines, said engines being pivotally attached to said supports, links, one end of which is pivotally connected to said supports, a block to which the other end is pivoted, a threaded rod, bearings in which said rod rotates but which prevent its longitudinal movement, said block being threaded on said rod, and means to rotate said rod and thereby shift the position of an engine.

2. The combination, with an airplane, of a plurality of engines, pivotal supports for said engines, said engines being pivotally at-attached to said supports, links, one end of which is pivoted to said supports, a block to which the other end is pivoted, a threaded rod, bearings in which said rod rotates but which prevent its longitudinal movement, said block being threaded on said rod, and means to rotate said rod and thereby shift the position of an engine, said means being operable from the cockpit of the plane.

3. In an aircraft, an engine, means for pivotally supporting said engine in operative position on an axis lengthwise of the craft, and constantly-rigid movable means for rocking said engine about said pivotal support whereby the engine may be moved laterally with reference to the craft without interruption of its operation.

4. The combination in an aircraft comprising a fuselage and wings extending laterally therefrom, of two motors symmetrically positioned and operatively mounted on opposite sides of the fuselage, propellers driven by the motors, supports mounted on the wings on axes lengthwise of the craft and carrying said motors, and constantly-rigid movable means connected to each of said supports whereby either of said motors may be swung inward toward the fuselage without changing the plane of propeller revolution and without interrupting the operation thereof.

5. The combination in an aircraft comprising a fuselage and wings extending laterally therefrom, of motors symmetrically mounted on top of the wings on opposite sides of the fuselage, propellers driven by the motors, supports mounted on the wings on axes lengthwise of the craft and carrying said motors, and constantly-rigid movable means connected to each of said supports whereby any one of said motors may be swung inward toward the fuselage without changing the plane of propeller revolution and without stopping operation of the motor and propeller.

THOMAS F. HAMILTON.